INVENTOR.
HAROLD DE POY COOK

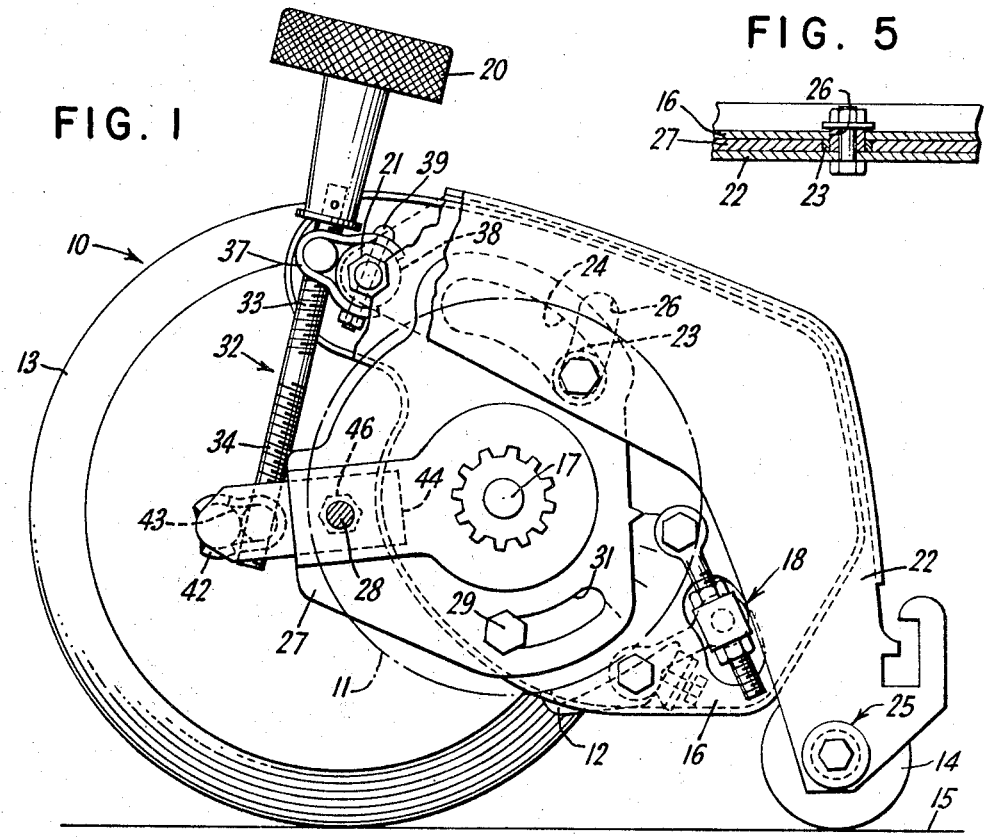
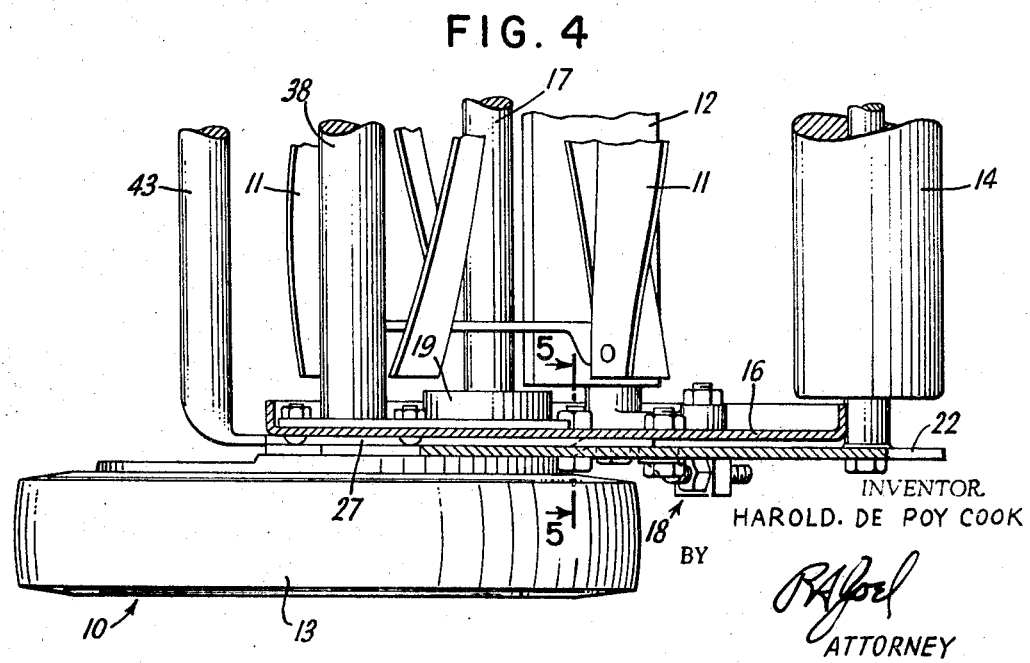

BY

ATTORNEY

United States Patent Office 3,423,919
Patented Jan. 28, 1969

3,423,919
LAWN MOWER
Harold De Poy Cook, Des Moines, Iowa, assignor to American Machine & Foundry Company, a corporation of New Jersey
Filed Aug. 31, 1966, Ser. No. 576,272
U.S. Cl. 56—249          8 Claims
Int. Cl. A01d 55/20

This invention relates to lawn mowers and particularly to means for adjusting the height of the cutting mechanism of a mower relative to the ground.

In order to efficiently cut grass and the like, a lawn mower should be designed with some provision for adjusting the position of the cutting mechanism, that is, the reel and cooperating cutter bar, to compensate for the height and type of grass to cut. Furthermore, it is desirable to provide the operator with means whereby he can determine the precise height of lawn which will be obtained by mowing. A number of prior art devices such as disclosed in Patent 2,340,849 to F. W. Wildeboor et al. and 2,660,018 to R. D. Clemsen broadly teach the use of lawn mower height adjustment means. The present invention, however, represents a distinct improvement over the prior art since the height adjustment means is relatively simple to operate and construct and is adjustable over a broad range. The one-point adjustment arrangement of the present invention eliminates the need for separate adjustments on either side of the reel and also provides a mechanical advantage and a convenience to the operator.

Accordingly, an object of this invention is to provide a new and improved lawn mower including means for adjusting the position of the cutting mechanism.

Another object of this invention is to provide a simple and convenient means to adjust the position of the cutting reel and bar of a lawn mower relative to the ground.

A further object of this invention is to provide an efficient one-point adjustment means for adjusting the position of a lawn mower cutting mechanism over a broad range.

A more specific object of this invention is to provide a new and improved height adjustment means for adjusting the cutting mechanism of a lawn mower, said means including a screw-actuated coupling arrangement which changes the position of the wheels and the roller relative to the centerline of the reel.

With the above and other objects and advantages in view, the present invention relates to a reel-type lawn mower having a self-leveling adjustment arrangement whereby the reel and cutter bar assembly may be adjusted in height relative to the wheels and roller without changing the position of the cutter bar relative to the reel or the attitude of the cutting means relative to the ground. The reel and cutter bar are carried on side frames supported pivotally at their front ends by an adjustable link coupled to the axle on which the primary supporting wheels are journaled. Each of the frames is also supported rearwardly of the front pivot on a cam member projecting from a roller arm. To provide this rear support, a cam pate is journaled on the reel axle and also pivotally connected to the wheel axle at a point spaced from the reel axle. The cam plate includes a slot through which the projecting cam member on the roller arm extends in cam follower fashion. Hence, when the front end of each side frame is elevated or lowered, this movement is accompanied by pivotal movement of the cams to effect simultaneously a readjustment of the rearward support of the frame on the roller arms.

In this manner, the frame and thus the reel and cutter bar are elevated or lowered without changing the attitude of the cooperating cutting elements with reference to the grass or to each other. Also, the height adjustment means on each side of the mower are interconnected so that an equal adjustment is made on each side of the lawn mower simultaneously. The height adjustment means is, thus, relatively simple and inexpensive to build and quite efficient in operation. The self-leveling adjustment is also suitable for use either with manual or motor driven mowers.

Other objects and advantages will be apparent from the following detailed description when read in conjunction with the accompanying drawings, wherein:

FIG. 1 shows a side view of the invention with parts of the structure cut away to illustrate the operation thereof; conventional portions of the lawn mower unnecessary to a showing of the invention are omitted;

FIG. 4 is a partial top view of the invention; and

FIG. 5 is a view of the structural arrangement taken along the line 5—5 of FIG. 4.

Figure 2:
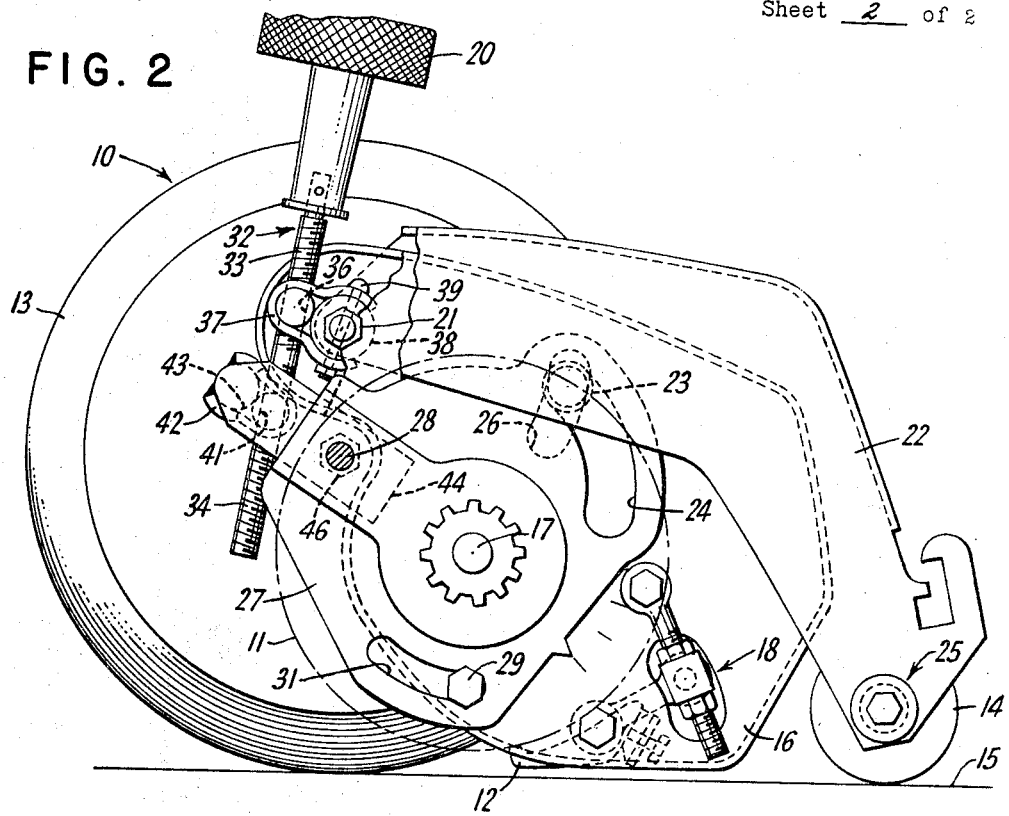
FIG. 2 shows a side view of the invention similar to FIG. 1 but with the cutting mechanism illustrated in a lowered position.
Figure 3:
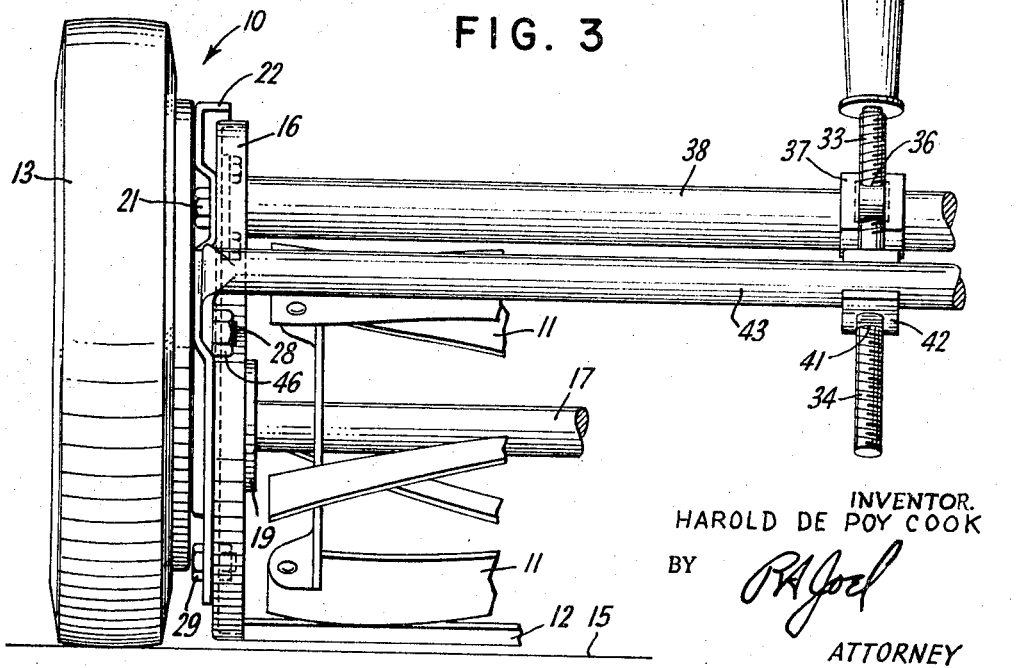
FIG. 3 is a partial front view of the invention.

Referring now to the drawings, the invention comprises a height adjustment for a lawn mower 10 which is efficient in operation and possesses numerous other advantages over the prior art. The height adjustment comprises means whereby the reel 11 and cutter bar 12 of a mower 10 may be raised or lowered with reference to the ground 15 by the pivotal movement of the supporting wheels 13 and roller 14 about designated axes. As the wheels 13 and roller 14 are driven in a particular direction, the reel assembly which is supported by said members 13 and 14 is adjusted relative to the ground 15.

The reel 11 and cutter bar 12 are mounted in frame portions 16 at each end while the wheels 13 and roller 14 which support the mower 10 are mounted for pivotal movement thereabout. An operator manipulates the control knob 20 in order to effect a simultaneous movement of the wheel centerline and the roller centerline with respect to the axis 17 of the reel 11. This movement raises or lowers the cutting assembly of reel 11 and bar 12 to permit efficient mowing without affecting the relationship between the reel 11 and cutting bar 12 or the attitude of the reel assembly with reference to the grass.

In greater detail, a reel-type mower 10, the pertinent portions of which are shown in FIGS. 1 and 2 of the drawings, includes a reel 11 and cutter bar 12 which are adjustably mounted relative to one another by means of a linkage 18 which is connected to the frame portions 16. The reel 11 is journaled in bearings 19 for rotational movement which is transmitted thereto from the wheels 13 in a conventional manner. The frames 16 are mounted about the bearings 19 and are connected at 21 to a corresponding roller arm 22. The roller 14 is mounted between the roller arms 22 by connecting means 25.

Each roller arm 22 includes a cam member or follower 23 which extends at right angles through slotted portions 24 and 26 in a juxtaposed cam plate 27 and side frame 16, respectively. The cam plates 27 are positioned in general between a side frame 16 and a roller arm 22, see FIG. 5. To obtain the desired cam movement, the cam plates 27 are pivoted about the wheel axis 28 and are also pivotal about the reel axis 17. In operation, the movement of the cam plates 27 causes the roller arms 22 to be raised or lowered through the action of follower 23 in slot 24. Generally, the cam slots 24 are designed to move the roller 14 on the roller arm the same distance as the wheels 13 while maintaining the attitude of the cutting means through all adjustments in height of cut. The side frames 16 are also connected by means of element 29 to the slotted portion 31 of the cam plate for added stability.

The self-leveling height adjustment operation is attained by the "one-point" control knob 20 which is centrally located between the wheels 13 and is connected to an elongated threaded member 32. The member 32 includes oppositely threaded upper and lower portions 33 and 34, respectively. The upper portion 33 engages a threaded aperture 36 in the member 37 which is connected to the bar 38 by the nut and bolt arrangement 39. The bar 38 is fixedly connected to a corresponding side frame 16 and roller arm 22 at each end to cause movement of the side frames 16 and the front portion of the roller arms 22 about the reel axis 17. The cam member 23 which is mounted on each of the roller arms 22 follows the slot 24 in the cam plate 27 thus moving the arm 22 by a predetermined increment in the desired direction. In this manner the roller 14 is moved back and forth relative to the wheels 13 to raise or lower the reel 11. The slot 26 in the side frame 16 permits unobstructed movement of the cam member 23.

The lower portion 34 of the threaded member 32 engages a threaded aperture 41 in a connecting member 42 mounted on the torque tube 43. The torque tube 43 includes end portions 44 extending at right angles to the axis of the tube 43. The end portions 44 are mounted along with the cam plates 27 about the axis of the wheels 13 by means of nut 46. Any movement of the torque tube 43, therefore, causes a corresponding movement of the reel 11 as the cam plates 27 pivot about the wheel axis 28. Thus, the wheels 13 may be moved simultaneously with the roller 14 with respect to the axis 17 of the reel 11 to in effect adjust the height of the reel 11 above the ground 15.

In operation, the knob 20 is turned in the desired direction to raise or lower the cutting mechanism by a predetermined increment. An indicator (not shown) may be positioned over the threaded member 32 to permit a precise determination of the height of cut. The threaded member 32 serves as a driving means which moves the bar 38 and torque tube 43 in opposite directions and causes simultaneous movement of the wheels 13 and roller 14 in opposite directions. The wheels 13 pivot about the reel axis 17 while the front portion of the roller arm 22 does likewise. The rear portion of the roller arm 22 having the roller 14 affixed thereto is guided by the action of cam member 23 in slot 24 of cam plate 27. The result of this movement is to adjust the height of the reel 11 and cutter bar 12 above the ground 15.

In FIG. 1, the reel 11 is shown in a raised position with the follower 23 in the lower portion of slot 24, while in FIG. 2, the movement of the cam plate 27 causes the follower 23 and connecting arm 22 to move to the top of slot 24 thereby lowering the cutting mechanism of the mower 10. The subject height adjustment is thus broadly adjustable within the height limits shown in FIGS. 1 and 2.

It is to be understood that the above-described arrangements are merely illustrative examples of the application of the principles of the invention. Numerous other arrangements may be readily devised by those skilled in the art, which will embody the principles of the invention and fall within the spirit and scope thereof. For example, the subject invention may be used with either a manual or a power-driven lawn mower without departing from the ambit of the invention.

What is claimed is:
1. In a lawn mower having a reel and cutter bar assembly, a height adjustment device comprising:
   a frame portion at each end of the mower having the reel and cutter bar assembly mounted therebetween,
   a pair of wheels coupled to the reel for supporting and driving said reel,
   a separate roller arm connected to each of said frame portions and having a cam member extending laterally therefrom,
   a roller mounted at one end of the roller arms and extending therebetween,
   a cam plate positioned intermediate each frame portion and the corresponding roller arm, said plate being pivotal about the wheel axis and pivotal about the reel axis, the plate including a cam slot which engages the cam member on the roller arm to move said arm and roller in a predetermined manner,
   means coupling the roller arm and the frame portion at each end,
   means coupling the corresponding cam plates about the wheel axis, and
   means for simultaneously moving the means coupling the roller arm and the frame portion at each end and the means coupling the cam plates to change the position of the wheel centerline and roller centerline relative to the reel axis and thereby adjust the height of said reel and cutter bar assembly above the ground.

2. A height adjustment device according to claim 1 wherein:
   the means for simultaneously moving the means coupling the roller arm and frame portion at each end of the mower and the means coupling the cam plates comprises screw actuating means for driving the respective coupling means in opposite directions causing the wheels to move in one direction while the roller is driven in a second direction, the movement of the roller being guided by the operation of the cam members in the cam slots.

3. A height adjustment device according to claim 2 wherein:
   the screw actuating means comprises a threaded member having oppositely threaded portions at each end and connecting means at one end for driving said screw means, and
   the means coupling the roller arm and frame portion and the means coupling the cam plates each include thread engaging means mounted thereon to be driven by the screw actuating means.

4. A height adjustment device in accordance with claim 1 wherein:
   the means for moving the respective coupling means is mounted to each of said means and moves the wheels and roller simultaneously and in opposite directions to change the position of the reel and cutter bar assembly relative to the ground.

5. In a lawn mower having a frame, a reel and cutter bar assembly mounted on said frame and a pair of supporting wheels coupled to the reel for driving said reel into and out of engagement with the cutter bar, the combination comprising:
   a roller arm pivotally mounted to the frame at each end of the reel and having a cam member extending laterally therefrom and a roller mounted at one end of said arms and extending therebetween,
   cam means being rotatably mounted about the wheel axis and pivotal about the reel axis, said cam means engaging the cam member on the roller arm, and
   means for actuating the cam means to move the roller in one direction and for actuating the wheels to move in a second direction to change the height of the reel and cutter bar assembly relative to the ground while maintaining the attitude of the reel and cutter bar with respect to the lawn.

6. A lawn mower in accordance with claim 5 wherein the cam means comprises:
   a separate cam plate positioned intermediate the roller arm and frame at each end of the mower, said plate having a slot which engages the cam member on the roller arm.

7. A lawn mower in accordance with claim 5 wherein the means for actuating the cam means comprises:
   means coupling the pivotal roller arm and the frame at each end,
   means coupling the corresponding cam plates about the wheel axis, and
   actuating means connected to the respective coupling means for simultaneously driving said coupling means in predetermined directions to change the position of the reel and cutter bar assembly relative to the ground.

8. A lawn mower in accordance with claim 7 wherein: the means coupling the pivotal roller arm and the frame at each end comprises an elongated member extending between the respective roller arm and frame at each end of the mower and being connected to a corresponding roller arm and frame, and the means coupling the corresponding cam plates comprises an elongated member extending between the cam plates and being rotationally mounted to said cam plates about the wheel axis.

References Cited

UNITED STATES PATENTS

| | | | |
|---|---|---|---|
| 2,091,077 | 8/1937 | Limbach | 56—253 |
| 2,340,849 | 2/1944 | Wildeboor et al. | 56—249 |
| 2,660,018 | 11/1953 | Clemson | 56—249 |
| 3,217,479 | 11/1965 | Robinson et al. | 56—254 |

RUSSELL R. KINSEY, *Primary Examiner.*